United States Patent
Machida et al.

(10) Patent No.: US 10,494,792 B2
(45) Date of Patent: Dec. 3, 2019

(54) PERIPHERY MONITORING APPARATUS OF OPERATION MACHINE AND PERIPHERY MONITORING METHOD OF OPERATION MACHINE

(71) Applicant: Komatsu Ltd., Tokyo (JP)

(72) Inventors: Masaomi Machida, Hiratsuka (JP); Takeshi Kurihara, Hiratsuka (JP)

(73) Assignee: KOMATSU LTD., Tokyo (JP)

(*) Notice: Subject to any disclaimer, the term of this patent is extended or adjusted under 35 U.S.C. 154(b) by 0 days.

(21) Appl. No.: 15/562,154

(22) PCT Filed: Mar. 29, 2016

(86) PCT No.: PCT/JP2016/060115
§ 371 (c)(1),
(2) Date: Sep. 27, 2017

(87) PCT Pub. No.: WO2016/174977
PCT Pub. Date: Nov. 3, 2016

(65) Prior Publication Data
US 2018/0080198 A1 Mar. 22, 2018

(30) Foreign Application Priority Data
Apr. 28, 2015 (WO) .............. PCT/JP2015/062908

(51) Int. Cl.
*B60R 1/00* (2006.01)
*H04N 7/18* (2006.01)
(Continued)

(52) U.S. Cl.
CPC .............. *E02F 9/26* (2013.01); *B60K 35/00* (2013.01); *B60R 1/00* (2013.01); *E02F 9/16* (2013.01);
(Continued)

(58) Field of Classification Search
CPC ... H04N 7/00; H04N 5/00; B60R 1/00; B60R 11/00; G06T 11/60
See application file for complete search history.

(56) References Cited

U.S. PATENT DOCUMENTS 6,327,522 B1 * 12/2001 Kojima .............. B60K 35/00
348/115
9,332,229 B2   5/2016 Ishimoto
(Continued)

FOREIGN PATENT DOCUMENTS

CN      102947515 A    2/2013
CN      103828351 A    5/2014
(Continued)

OTHER PUBLICATIONS

International Search Report dated Jun. 28, 2016, issued for PCT/JP2016/060115.
(Continued)

*Primary Examiner* — Maryam A Nasri
(74) *Attorney, Agent, or Firm* — Locke Lord LLP

(57) ABSTRACT

A periphery monitoring apparatus of an operation machine, includes an acquisition unit acquiring a peripheral condition of the operation machine; an information output unit outputting information acquired by the acquisition unit; a lifted/lowered state detection unit detecting a lifted/lowered state of a lifting ladder provided in the operation machine; and an output control unit performing changing an output content in the information output unit in accordance with the lifted/lowered state of the lifting ladder, the output content being related to the information acquired by the acquisition unit, the lifted/lowered state being detected by the lifted/lowered state detection unit.

16 Claims, 13 Drawing Sheets

(51) Int. Cl.
  *E02F 9/26* (2006.01)
  *E02F 9/16* (2006.01)
  *B60K 35/00* (2006.01)
  *E02F 9/24* (2006.01)
  *H04N 5/00* (2011.01)
  *B60Q 9/00* (2006.01)
  *E02F 3/32* (2006.01)

(52) U.S. Cl.
  CPC ............... *E02F 9/24* (2013.01); *E02F 9/261* (2013.01); *H04N 7/181* (2013.01); *B60K 2370/152* (2019.05); *B60K 2370/176* (2019.05); *B60K 2370/186* (2019.05); *B60K 2370/1868* (2019.05); *B60K 2370/193* (2019.05); *B60K 2370/21* (2019.05); *B60K 2370/52* (2019.05); *B60K 2370/61* (2019.05); *B60Q 9/008* (2013.01); *B60R 2300/303* (2013.01); *B60R 2300/607* (2013.01); *B60R 2300/8093* (2013.01); *B60Y 2200/41* (2013.01); *E02F 3/32* (2013.01); *H04N 5/00* (2013.01)

(56) References Cited

U.S. PATENT DOCUMENTS

| | | | |
|---|---|---|---|
| 9,457,719 B2 | 10/2016 | Tanuki et al. | |
| 2001/0030081 A1* | 10/2001 | Morimoto | B60R 3/02 182/85 |
| 2006/0076712 A1* | 4/2006 | Yonemochi | B29C 37/0028 264/255 |
| 2013/0088593 A1 | 4/2013 | Ishimoto | |
| 2013/0182066 A1 | 7/2013 | Ishimoto | |
| 2014/0088824 A1 | 3/2014 | Ishimoto | |
| 2014/0347483 A1 | 11/2014 | Nakanishi et al. | |
| 2014/0354813 A1* | 12/2014 | Ishimoto | H04N 7/181 348/148 |
| 2015/0009329 A1 | 1/2015 | Ishimoto | |
| 2015/0163212 A1 | 6/2015 | Saegusa | |
| 2015/0217691 A1 | 8/2015 | Tanuki et al. | |
| 2016/0202351 A1* | 7/2016 | Uotsu | G01S 13/04 342/27 |
| 2016/0258134 A1 | 9/2016 | Matsumoto et al. | |

FOREIGN PATENT DOCUMENTS

| | | |
|---|---|---|
| JP | 10-072851 A | 3/1998 |
| JP | 2005-083033 A | 3/2005 |
| JP | 2009-269553 A | 11/2009 |
| JP | 2011-179215 A | 9/2011 |
| JP | 2012-074929 A | 4/2012 |
| JP | 2014-064192 A | 4/2014 |
| JP | 5572770 B1 | 8/2014 |
| JP | 5583871 B1 | 9/2014 |
| JP | 2015-029357 A | 2/2015 |
| WO | 2013/058093 A1 | 4/2013 |

OTHER PUBLICATIONS

Office Action dated Oct. 2, 2018, issued for the corresponding Canadian patent application No. 2,980,993.

* cited by examiner

PERIPHERY MONITORING APPARATUS OF OPERATION MACHINE AND PERIPHERY MONITORING METHOD OF OPERATION MACHINE

FIELD

The present disclosure relates to a periphery monitoring apparatus of an operation machine and a periphery monitoring method of the operation machine to perform a periphery monitoring in accordance with a lifted/lowered state of a lifting ladder.

BACKGROUND

In a field of an operation machine such as an excavator, there is a case where a plurality of cameras is provided on a rear side or a side of its vehicle body in addition to a mirror in such a manner that an operator (driver) can visually recognize an obstacle near the vehicle body. Then, an image imaged by a camera is displayed, as a single camera image, on its monitor in an operating room of the operation machine.

Also, there is one which generates a bird's eye image by converting an image of each camera into a top view and by composing images of cameras and displays the bird's eye image on the monitor in such a manner that 360° around a vehicle body can be observed. Also, there is one which displays a single camera image imaged by a camera selected by an operator, on the monitor in addition to the bird's eye image (see Patent Literature 1).

Moreover, in a large operation machine such as a large excavator, an operating room is provided at a high position from the ground. Thus, a boarding ladder is provided to allow an operator to access the operating room (see Patent Literature 2). Lifting/lowering control is performed on the lifting ladder when the operator gets in and out of the large operation machine.

CITATION LIST

Patent Literature

Patent Literature 1: Japanese Laid-open Patent Publication No. 2012-74929
Patent Literature 2: Japanese Laid-open Patent Publication No. 2005-83033

SUMMARY

Technical Problem

In an excavator such as an extra-large excavator to operate in a mine, a height of an upper swing body from the ground to a bottom surface is equal to or higher than two meters. Thus, it is not practically possible for an operator to get to a driver seat provided on the upper swing body without any measures. Thus, in a case where the operator moves from the ground to the driver seat, the above-described lifting ladder apparatus is used. The lifting ladder is stored in an upper part of the excavator during an operation thereof. After the operation, the ladder is lowered and the operator goes down to the ground. When the operation is to be resumed, the operator uses the lowered ladder and climbs up to a vicinity of the driver seat, lifts the ladder, and resumes the operation.

Here, in a state where the lifting ladder is lowered onto the ground, that is, when the excavator is in a stopped state, not only the operator but also a supervisor, a replacement operator, a maintenance staff or the like may come and go around the driver seat or an engine room by using the lifting ladder. Thus, there are many movements of people around the lifting ladder. Thus, it is preferable that the operator can understand a peripheral condition of the lifting ladder during maintenance or before starting an operation.

On the other hand, in a state where the lifting ladder is at its storage position in the upper swing body, the operator is trying to operate the excavator. Thus, it is preferable that a rear side of the vehicle body which is a region specifically difficult for the operator to visually recognize can be recognized.

The present disclosure is made in view of the forging circumstances and an object of the present disclosure is to provide a periphery monitoring apparatus of an operation machine and a periphery monitoring method of the operation machine to perform a periphery monitoring in accordance with a lifted/lowered state of a lifting ladder.

Solution to Problem

To resolve the above-described problem and attain the object, a periphery monitoring apparatus according to the present disclosure of an operation machine, includes an acquisition unit acquiring a peripheral condition of the operation machine; an information output unit outputting information acquired by the acquisition unit; a lifted/lowered state detection unit detecting a lifted/lowered state of a lifting ladder provided in the operation machine; and an output control unit performing changing an output content in the information output unit in accordance with the lifted/lowered state of the lifting ladder, the output content being related to the information acquired by the acquisition unit, the lifted/lowered state being detected by the lifted/lowered state detection unit.

Further, a periphery monitoring method according to the present disclosure of an operation machine, includes: an acquiring step to acquire a peripheral condition of the operation machine; an information output step to output information acquired in the acquiring step; lifted/lowered state detecting step to detect a lifted/lowered state of a lifting ladder provided to the operation machine; and output controlling step to perform changing an output content in the information output step in accordance with the lifted/lowered state of the lifting latter, the output content being related to the information acquired in the acquiring step, the lifted/lowered state being detected in the lifted/lowered state detecting step.

According to the present disclosure, an output content which is related to information acquired by an acquisition unit and which is in an information output unit are changed in accordance with a lifted/lowered state of a lifting ladder which state is detected by a lifted/lowered state detection unit. Thus, a periphery monitoring can be performed in accordance with a lifted/lowered state of the lifting ladder.

DESCRIPTION OF EMBODIMENTS

In the following, an embodiment of the present disclosure will be described with reference to the attached drawings.

[Whole Configuration of Excavator]

Figure 1:
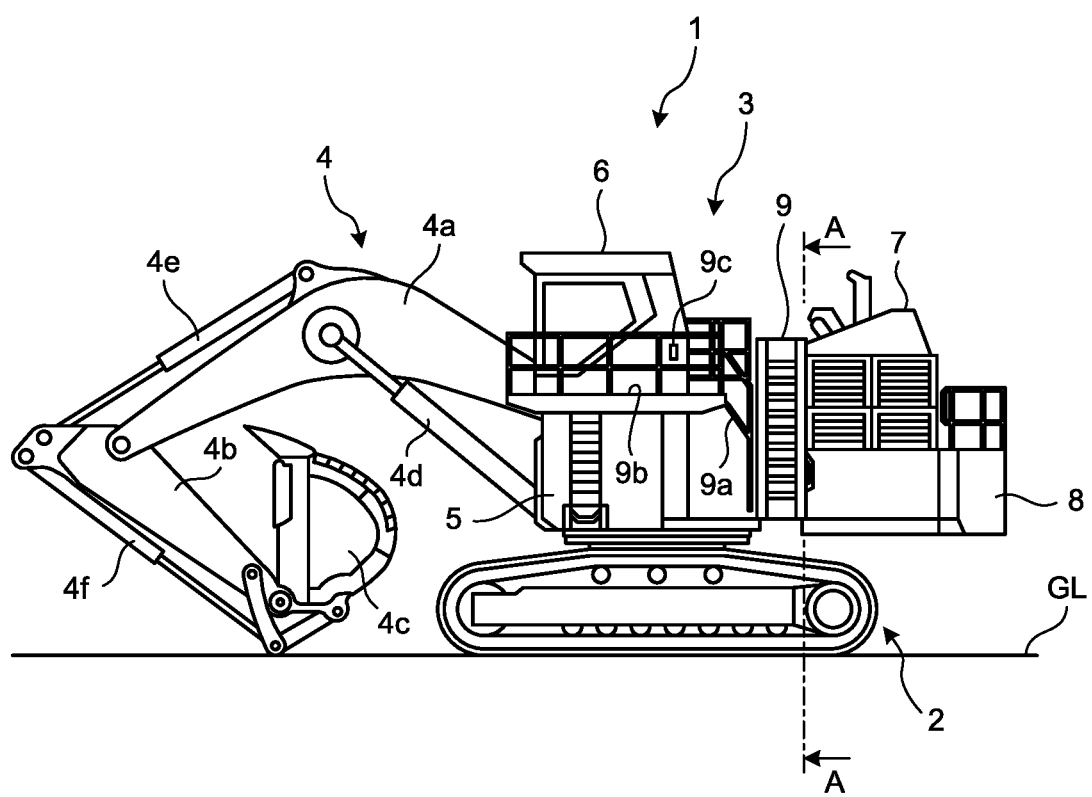
FIG. 1 is a side view illustrating a whole configuration of an excavator on which a periphery monitoring apparatus of an operation machine according to an embodiment of the present disclosure is mounted.

First, FIG. 1 is a side view illustrating a whole configuration of an excavator to which a periphery monitoring apparatus according to an embodiment of the present disclosure for an operation machine is mounted. An excavator 1 is a large excavator, which is illustrated as an example of an operation machine, such as a mining shovel used in a mine or the like. The excavator 1 includes a self-propelled lower traveling body 2, an upper swing body 3 swingably provided on the lower traveling body 2, and an operation machine 4 which operates in a flexible and undulating manner at a center in a front part of the upper swing body 3.

The operation machine 4 includes a boom 4a, an arm 4b, a bucket 4c, a boom cylinder 4d, an arm cylinder 4e, and a bucket cylinder 4f. A base end of the boom 4a is rotatably coupled to the upper swing body 3. Also, a leading end of the boom 4a is rotatably coupled to a base end of the arm 4b. A leading end of the arm 4b is rotatably coupled to the bucket 4c. The boom cylinder 4d, the arm cylinder 4e, and the bucket cylinder 4f are hydraulic cylinders driven by hydraulic oil discharged from a hydraulic pump. The boom cylinder 4d makes the boom 4a operate. The arm cylinder 4e makes the arm 4b operate. The bucket cylinder 4f is coupled to the bucket 4c via a link member and makes the bucket 4c operate. A cylinder rod of the bucket cylinder 4f performs an extension/contraction operation, whereby the bucket 4c is operated. Note that in FIG. 1, an opening of the bucket 4c functions as a backhoe which faces a swing center. However, the opening of the bucket 4c may function as a front shovel facing the outside from the swing center.

In a front left part of the upper swing body 3, an operating room 6 is provided via a cab base 5. In a rear part of the upper swing body 3, a power container 7 is mounted. In the power container 7, an engine, a hydraulic pump, a radiator, an oil cooler, and the like are stored. At a rear end of the upper swing body 3, a counter weight 8 is mounted. On a left side part of the upper swing body 3, a lifting ladder 9 is arranged in such a manner as to be placed in a rear part of the cab base 5. The lifting ladder 9 supports an operator or a maintenance staff to go up to/down from the upper swing body 3.

[Driver Seat]

Figure 2:
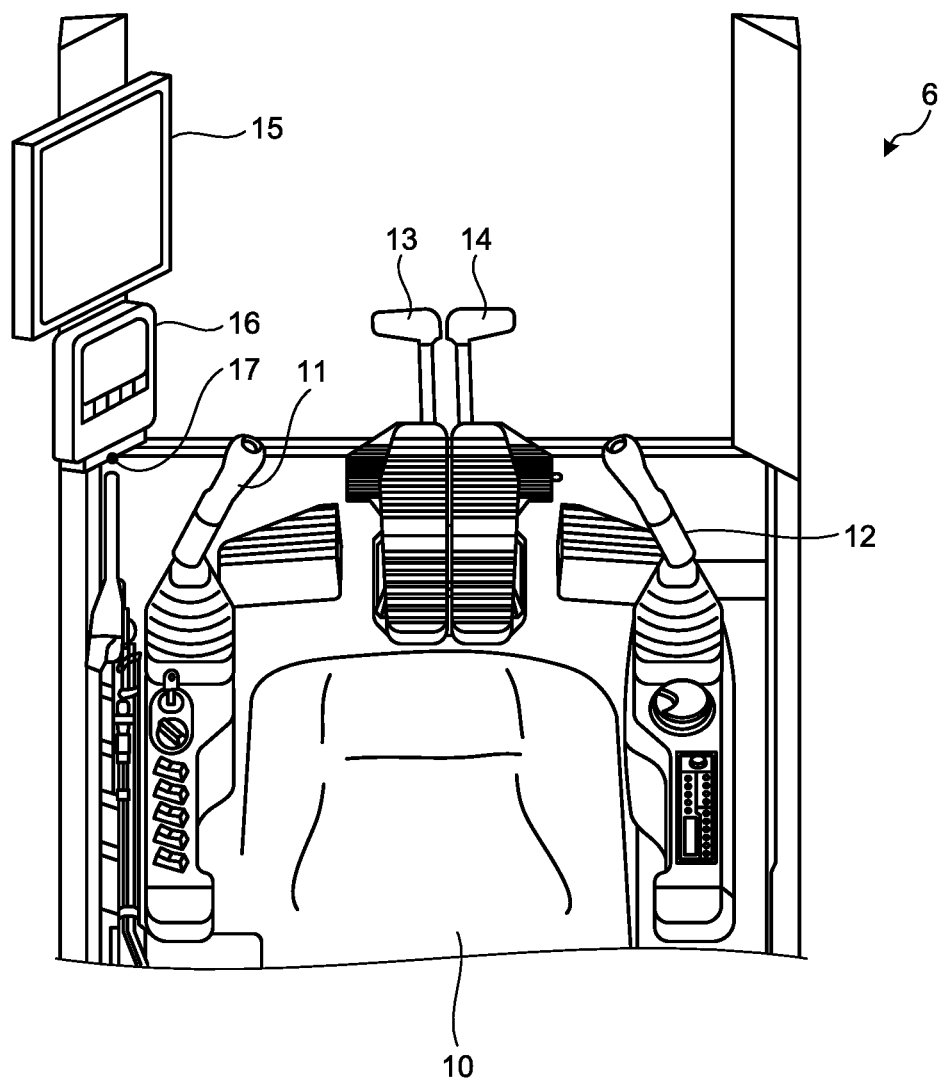
FIG. 2 is a view illustrating an inner layout of an operating room.

FIG. 2 is a view illustrating an inner layout of the operating room 6. As illustrated in FIG. 2, operation levers 11 and 12 are respectively arranged on left and right sides of an operator seat 10 in the operating room 6. The operation lever 11 is arranged on a left-hand side when an operator is seated on the operator seat 10. The operation lever 12 is arranged on a right-hand side when the operator is seated on the operator seat 10. The operation lever 11 corresponds to a swing operation of the upper swing body 3 and an operation of the arm 4b. When the operation lever 11 is operated to the right/left, the upper swing body 3 swings to the right/left. When the operation lever 11 is operated upward/downward, the arm 4b rotates in the front/rear direction. The operation lever 12 corresponds to an operation of the boom 4a and an operation of the bucket 4c. When the operation lever 12 is operated to the right/left, the bucket 4c rotates in the excavation/discharge direction. When the operation lever 12 is operated upward/downward, the boom 4a rotates in the upward/downward direction. Note that a combination of an operation of each of the operation levers 11 and 12 and an operation machine is not limited to what is described in the present embodiment.

The traveling lever 13 can perform forward/backward traveling of a crawler on the left side of the lower traveling body 2 according to an operation. Also, the traveling lever 14 can perform the forward/backward traveling of the right crawler of the lower traveling body 2 according to an operation. When the traveling levers 13 and 14 are operated simultaneously, the right and left crawlers are driven simultaneously, whereby the forward/backward traveling of the whole excavator 1 can be performed.

Also, in a frame in a front left of the operating room 6, a periphery monitoring monitor 15, a monitor 16, and a buzzer 17 are arranged. The periphery monitoring monitor 15 is an input device including a touch panel and can at least display, as a bird's eye image and a single camera image, a peripheral condition of the excavator 1, the peripheral condition having been acquired by a plurality of cameras. The monitor 16 is an input/output apparatus including a liquid crystal display unit and a key input unit. The monitor 16 can display various kinds of information including a state of an engine, a hydraulic pump or the like. For example, the monitor 16 can display a machine gauge display of an engine water temperature, an oil temperature, a remaining amount of fuel or the like, a failure information display indicating a trouble or the like of a device, and a user menu display for various kinds of setting having been performed by the operator. The buzzer 17 sounds when an obstacle is detected by a plurality of radars. Note that when an obstacle is detected, an information related to the obstacle is also displayed on the above-described periphery monitoring monitor 15, more detail thereof being described later. Note that the above machine gauge display, failure information display, and user menu display may be displayed on the periphery monitoring monitor 15.

[Lifting Ladder]

Figure 3:
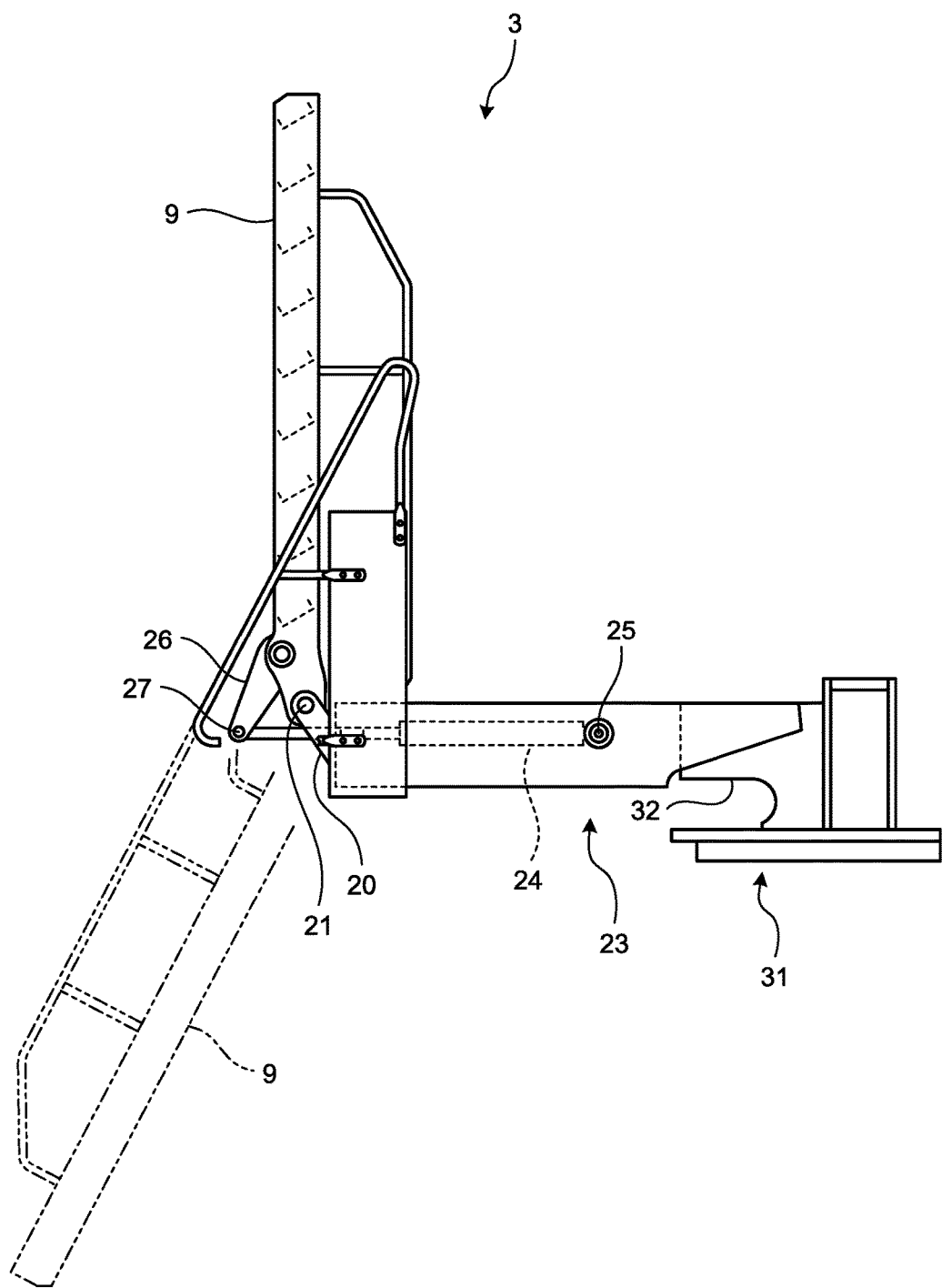
FIG. 3 is an A-A sectional view illustrating a configuration of a periphery of the lifting ladder of the excavator illustrated in FIG. 1.

FIG. 3 is an A-A sectional view illustrating a configuration of a periphery of the lifting ladder 9 of the excavator 1 of FIG. 1. As illustrated in FIG. 3, to a swing frame 31 included in a frame of the upper swing body 3, a ladder supporting frame 23 is fixed via a bracket 32. On a leading end side of the ladder supporting frame 23, a pin 21 couples a bracket 20 and a base end of the lifting ladder 9. Into the ladder supporting frame 23, a lifting ladder hydraulic cylinder 24 is embedded. The base end of the lifting ladder hydraulic cylinder 24 is coupled via a bracket (not illustrated), which is provided in the ladder supporting frame 23, and a pin 25. A leading end of the lifting ladder hydraulic cylinder 24 is coupled via a lever member 26, which is provided in a base part of the lifting ladder 9, and a pin 27. Also, a stroke sensor 24a is provided to the lifting ladder hydraulic cylinder 24 although not illustrated in FIG. 3.

When the lifting ladder hydraulic cylinder 24 is extended, the lifting ladder 9 moves to a state of a storage arrangement in which storage on a side of the upper swing body 3 is performed. On the other hand, when the lifting ladder hydraulic cylinder 24 is contracted, the lifting ladder 9 moves to a state of a usage arrangement in which the lifting ladder 9 is protruded from the upper swing body 3 to the ground, as indicated by a dashed-two dotted line. Note that an instruction of lifting/lowering of the lifting ladder 9 can be performed by pressing of a lifting/lowering switch 9c (see FIG. 1) provided on a side surface on a side of a catwalk 9b in the operating room 6. Also, in the usage arrangement in which the lifting ladder 9 is on the ground, an operator or the like climbs up the lifting ladder and enters the operating room 6 through stairs 9a and the catwalk 9b (see FIG. 1). Here, the above-described lifting/lowering switch 9c is operated and the lifting ladder 9 is brought to the storage arrangement. On the other hand, when climbing down from the operating room 6, the operator goes down to the ground (ground surface level GL) through the catwalk 9b, the stairs 9a, and the lifting ladder 9 after operating the lifting/lowering switch 9c and bringing the lifting ladder 9 into the usage arrangement from the storage arrangement. Note that the lifting/lowering switch 9c is not necessarily provided to the side surface of the catwalk and may be provided to a different position in the excavator such as in the operating room 6.

[Whole Configuration of Control System]

Figure 4:
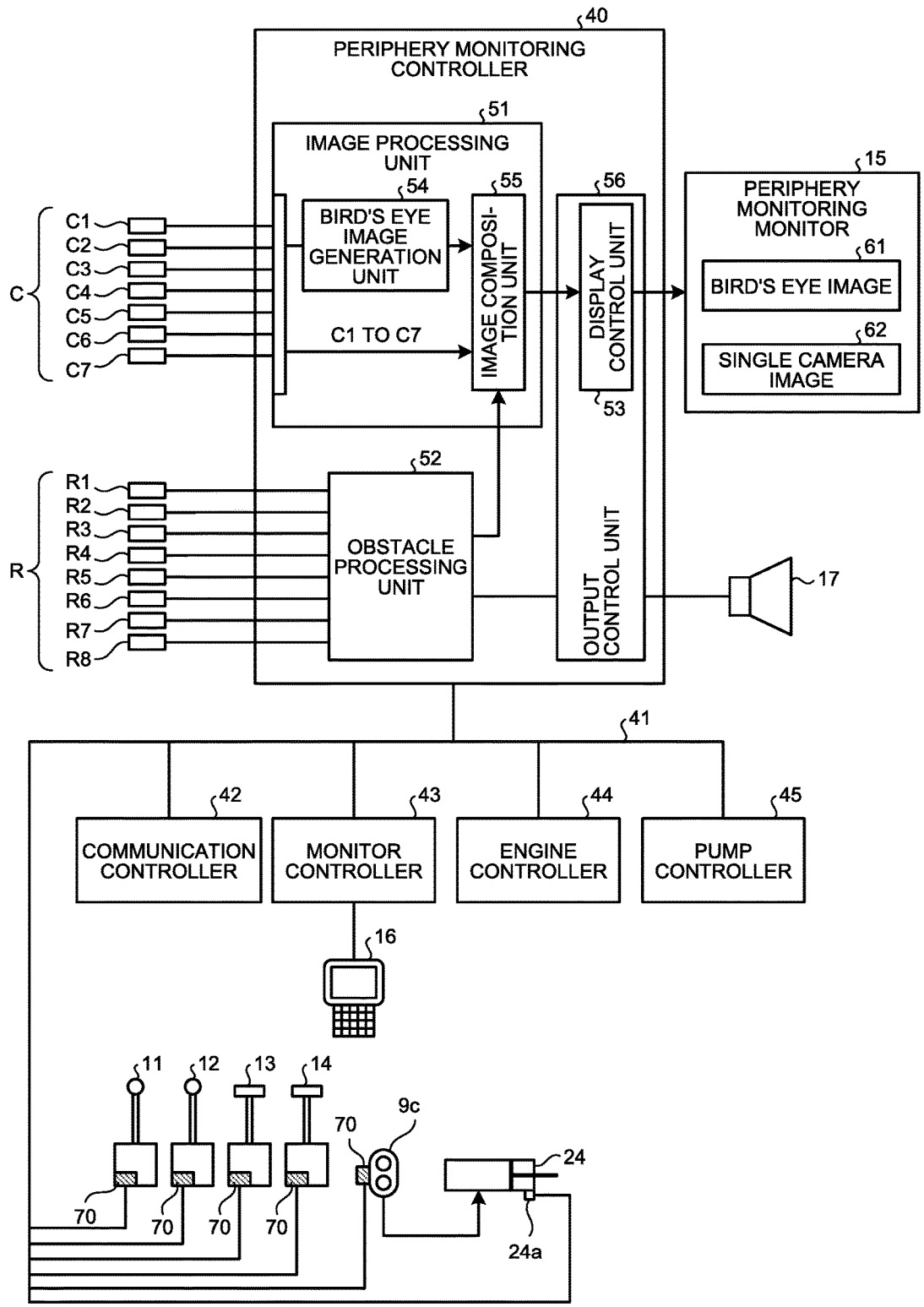
FIG. 4 is a block diagram illustrating a whole control system of the excavator and a detail configuration of a periphery monitoring controller.

FIG. 4 is a block diagram illustrating a configuration of a whole control system of the excavator 1. As illustrated in FIG. 4, a periphery monitoring controller 40 is connected to a CAN 41 which is one of in-vehicle networks. To the CAN 41, a communication controller 42, a monitor controller 43, an engine controller 44, a pump controller 45, the operation levers 11 and 12, the traveling levers 13 and 14, the lifting/lowering switch 9c, the stroke sensor 24a of the lifting ladder hydraulic cylinder 24, and the like are connected. Also, to the periphery monitoring controller 40, a camera group C including a plurality of cameras C1 to C7, a radar group R including a plurality of radars R1 to R8, the periphery monitoring monitor 15, and the buzzer 17 are connected.

The periphery monitoring controller 40 performs periphery monitoring control. The periphery monitoring controller 40 includes an image processing unit 51, an obstacle processing unit 52, and an output control unit 56. Moreover, the image processing unit 51 includes a bird's eye image generation unit 54 and an image composition unit 55. Further, the output control unit 56 includes a display control unit 53.

Figure 5:
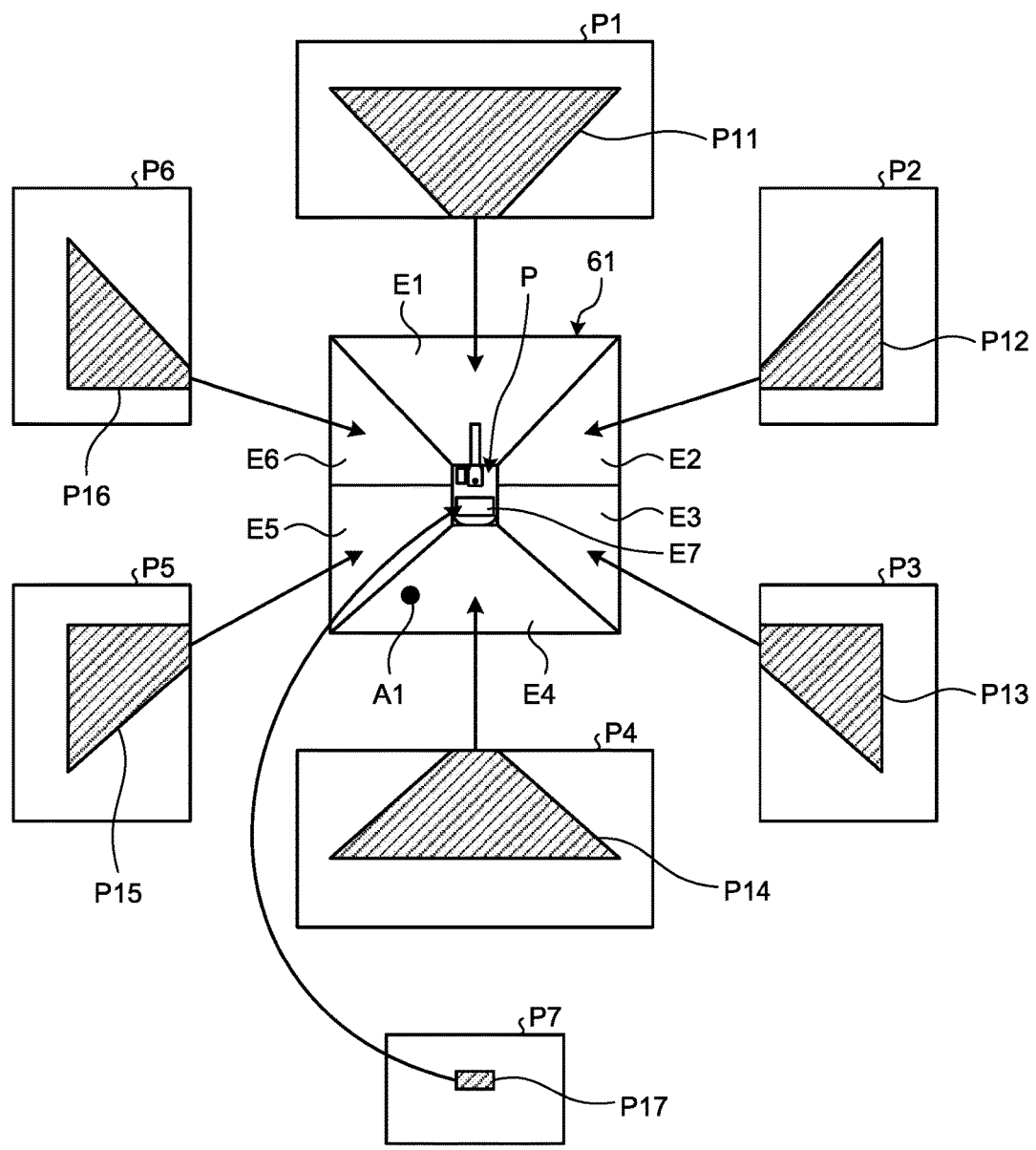
FIG. 5 is a description view for describing generation process of a bird's eye image performed by a bird's eye image generation unit.

The bird's eye image generation unit 54 generates a bird's eye image 61 based on images acquired from the cameras C1 to C7. As illustrated in FIG. 5, the bird's eye image generation unit 54 converts the images P1 to P7 acquired from the cameras C1 to C7 into top view images. That is, the bird's eye image generation unit 54 performs a conversion into images seen from a predetermined virtual viewpoint placed in an upper side of the excavator 1. More specifically, the bird's eye image generation unit 54 performs an image conversion in which a projection from the virtual viewpoint on the upper side of the excavator 1 onto a virtual projection surface corresponding to the ground surface level GL is performed. Then, the bird's eye image generation unit 54 extracts conversion images P11 to P17 corresponding to regions E1 to E7 in a frame to display the bird's eye image and composes the conversion images P11 to P17 in the frame. To the bird's eye image 61 generated by the bird's eye image generation unit 54, an image P corresponding to a plane view of the excavator 1 is previously attached.

On the other hand, the obstacle processing unit 52 detects an obstacle based on information of the radars R1 to R8. When detecting an obstacle, the obstacle processing unit 52 reports by making the buzzer 17 sound and outputs an obstacle information such as a size or a position of the detected obstacle to the image composition unit 55. The obstacle information is a point A1 illustrated in FIG. 5. To the image composition unit 55, the above-described bird's eye image 61 and images (a single camera image 62) imaged by the cameras C1 to C7 are input. In a case where the obstacle information is input from the obstacle processing unit 52, an image which is a composition of the obstacle information with the above-described bird's eye image 61 and the single camera image 62 is generated. For example, after composition of the obstacle information A1, which is in the region E4 in FIG. 5, with the bird's eye image 61 is performed, the bird's eye image is displayed on the periphery monitoring monitor 15. In this case, the operator can easily understand a position of the obstacle or a distance thereof from the excavator.

Note that when an obstacle is detected, an outer frame of the regions E1 to E7 in the bird's eye image 61 in which the obstacle exists or an outer frame of the single camera image 62 in which the obstacle exists may be displayed in a blinking manner (frame borders may be blinked). Due to the blinking display, the operator can easily understand that there exists an obstacle. Note that another highlighting may be used instead of the blink display. For example, a thickness or a color of a frame may be changed. The above obstacle information may be the point A1 illustrated in FIG. 5 or a configuration such as buzzer sounding, a blink display or the like as long as the existence of the obstacle can be emphasized and notified to the operator. Note that the buzzer sounding is controlled by the output control unit 56.

Note that "changing an output content" described in claims includes not making the buzzer sound as well as not displaying the above point, the blink display or the like.

The display control unit 53 performs control to display, on the periphery monitoring monitor 15, the bird's eye image 61 output from the image composition unit 55 and the single camera image 62 selected among images imaged by the cameras C1 to C7.

The monitor controller 43 is connected to the monitor 16. The monitor controller 43 performs input/output control of various kinds of information such as an information transmitted from various sensors through the CAN 41 or an information input through the monitor 16. As described above, for example, the monitor 16 can display an engine water temperature, an oil temperature, a remaining amount of fuel, or alarm information indicating a trouble of a device.

The lifting ladder hydraulic cylinder 24 is driven according to an operation of the lifting/lowering switch 9c. Also, a stroke amount of the lifting ladder hydraulic cylinder 24 is detected by the stroke sensor 24a and a detection result is output to the periphery monitoring controller 40.

[Configuration and Arrangement of Camera]

Figure 6:
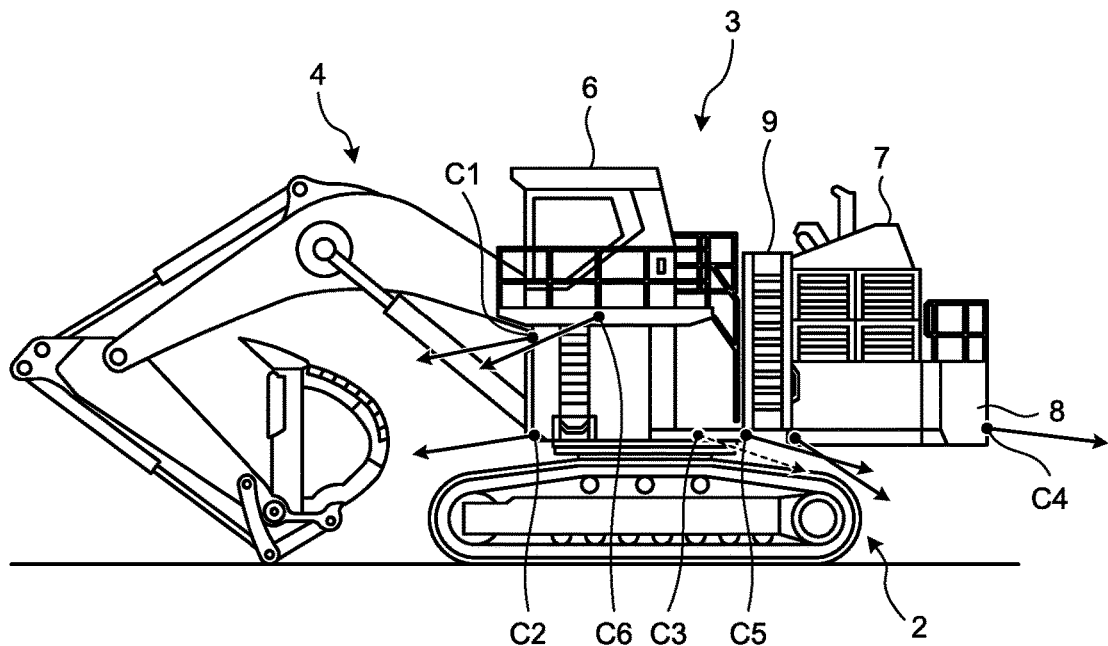
FIG. 6 is a side view illustrating positions of cameras.
Figure 7:
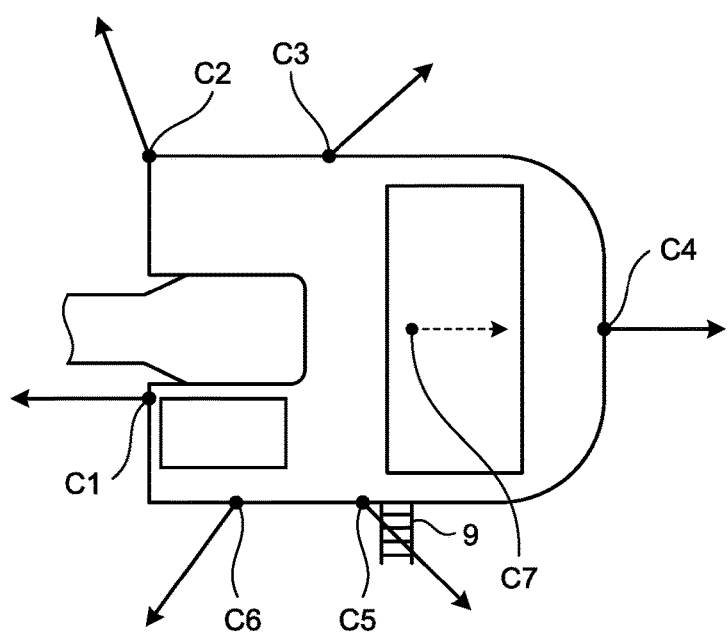
FIG. 7 is a plane view schematically illustrating the positions of the cameras.

Next, with reference to FIG. 6 and FIG. 7, a configuration and an arrangement of each of the cameras C1 to C7 will be described. FIG. 6 is a side view of the excavator and FIG. 7 is a simplified plane view of the excavator upper swing body. A crawler is supposed to be in each of right and left end regions of the upper swing body in FIG. 7. However, as a matter of convenience, the right and left crawlers are not illustrated and only the upper swing body is illustrated. Also, on a rear left side of the upper swing body in FIG. 7, the lifting ladder 9 is illustrated. Note that a position of the lifting ladder is not limited to the rear left side of the upper swing body and may be positioned at any position. All of the cameras C1 to C7 may be attached to the upper swing body 3. For example, each of the cameras C1 to C7 has a view range of 120° in right and left directions (60° in each direction) and 96° in a height direction. A charge-coupled device (CCD) camera can be used as a camera. Also, each of the cameras C1 to C7 may include a wide dynamic range function.

More specifically, as illustrated in FIG. 6 and FIG. 7, the camera C1 is provided to a front surface of the cab base 5, which is a lower part of the operating room 6 in the upper swing body 3, to capture an image of the front of the upper swing body 3. The camera C2 is provided to a lower front part on a right side of the upper swing body 3 to capture an image on a front right side of the upper swing body 3. The camera C3 is provided to a lower part on a right side surface of the upper swing body 3 to capture an image on a rear right side of the upper swing body 3. The camera C4 is provided to a center of a lower rear part of the counter weight 8, which is arranged in a rear side of the upper swing body 3, to capture an image on a rear side of the upper swing body 3. The camera C5 is provided to a lower part on a left side surface of the upper swing body 3 to capture an image on a rear left side of the upper swing body 3. The lifting ladder 9 is included in an imaging range of the camera C5. The camera C6 is provided to an upper left side surface of the cab base 5 to capture an image on a front left side of the upper swing body 3. The camera C7 is provided to a lower part of the power container 7 to capture an image of a lower region of the power container 7 and the counter weight 8. Since imaging ranges of cameras C1 to C7 adjacent to each other overlap with each other, an outer periphery 360° of a proximate position of the excavator 1 can be imaged.

[Configuration and Arrangement of Radar]

Figure 8:
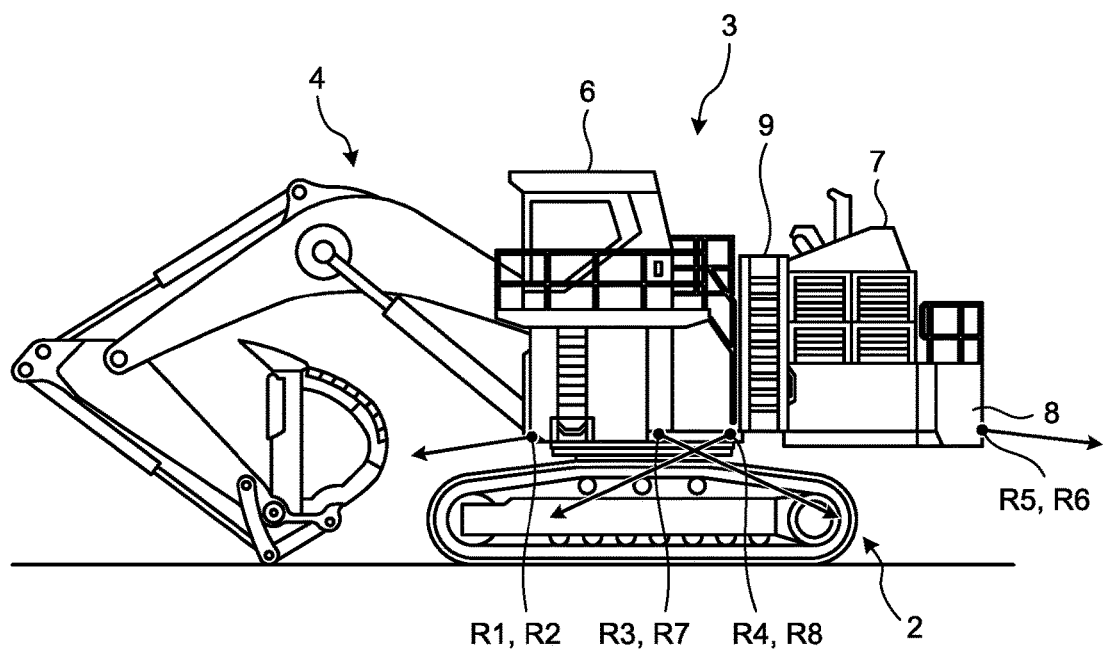
FIG. 8 is a side view illustrating positions of radars.
Figure 9:
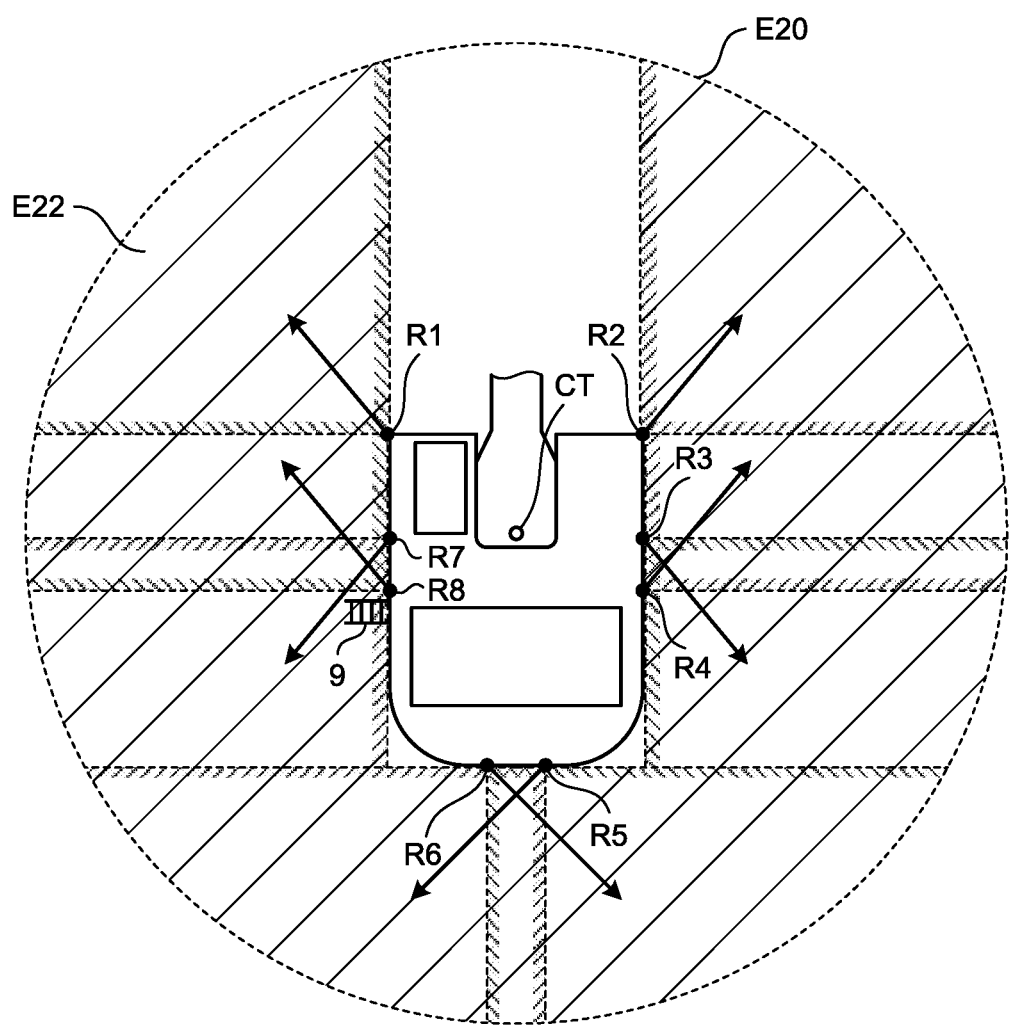
FIG. 9 is a plane view schematically illustrating the positions of the radars.

Next, with reference to FIG. 8 and FIG. 9, a configuration and an arrangement of each of the radars R1 to R8 will be described. All of the radars R1 to R8 may be provided to the upper swing body 3. Each of the radars R1 to R8 detects a relative position and a direction between an obstacle, which exists near the excavator 1, and the excavator 1. For example, as illustrated in FIG. 8 and FIG. 9, the radars R1 to R8 are attached to respective outer peripheral parts of the excavator 1. Also, each of the radars R1 to R8 is an ultra wide band (UWB) radar which has a detection angle of 80° (±40°) in an azimuth (horizontal) direction and 16° (±8°) in an up/down (vertical) direction and has a detection distance of which is equal to or longer than 15 meters at maximum.

More specifically, as illustrated in FIG. 8 and FIG. 9, the radar R1 is provided to a lower left end in a front part of the upper swing body 3 to detect an obstacle on a front left side of the upper swing body 3. The radar R2 is provided to a lower right end in the front part of the upper swing body 3 to detect an obstacle in a front right side of the upper swing body 3. Also, a provision direction of each of the radars R1 and R2 is adjusted so as not to detect the operation machine 4 such as the bucket 4c. Detection regions of the radars R1 and R2 do not overlap with each other. The radar R3 is provided to a lower part on a right side of the upper swing body 3 to detect an obstacle in a rear right side of the upper swing body 3. The radar R4 is provided to a lower part on the right side of the upper swing body 3 to detect an obstacle in a front right side of the upper swing body 3. Here, the radar R3 is arranged so as to be adjacent to the radar R4 and is arranged on a front side with respect to a position of the radar R4. Then, by emitting radar signals in such a manner that the signals intersect with each other and that detection regions overlap with each other, the radars R3 and R4 detect an obstacle in a whole right side of the upper swing body 3. Also, the radar R5 is provided to a lower part of the counter weight 8 of the upper swing body 3 to detect an obstacle in a rear left side of the upper swing body 3. The radar R6 is provided to a lower left part of the counter weight 8 to detect an obstacle in a rear right side of the upper swing body 3. Here, the radar R5 is arranged so as to be adjacent to the radar R6 and is arranged on a right side with respect to a position of the radar R6. Then, by emitting radar signals in such a manner that the signals intersect with each other and that detection regions overlap with each other, the radars R5 and R6 detect an obstacle in a whole rear side of the upper swing body 3. Also, the radar R8 is provided to a lower part on a left side of the upper swing body 3 to detect an obstacle in a front left side of the upper swing body 3. The radar R7 is provided to a lower part on the left side of the upper swing body 3 to detect an obstacle in a rear left side of the upper swing body 3. Here, the radar R8 is arranged to as to be adjacent to the radar R7 and is arranged on a rear side with respect to a position of the radar R7. Then, by emitting radar signals in such a manner that the signals intersect with each other and that detection regions overlap with each other, the radars R8 and R7 detect an obstacle in a whole left side of the upper swing body 3. Note that a region right in front of the excavator is not a detection region. This is to prevent a radar from detecting an operation machine. Thus, with the radars R1 to R8, an obstacle can be detected in a region E22 which is a peripheral region other than a region right in front of the excavator.

The region E20 in FIG. 9 indicates a region in a predetermined radius from a swing center CT of the upper swing body 3. When an obstacle is detected in the region, an obstacle information (such as buzzer sounding, point displayed on bird's eye image, or blink display) is output (ON) and when an obstacle is detected in a region other than this region, no obstacle information is output (OFF). Note that a radius of a region to switch ON/OFF of buzzer sounding and a radius of a region to switch ON/OFF of a point, which is displayed on a bird's eye image, and a blink display may be varied.

[Manual Image Switching Process of Periphery Monitoring Monitor]

Figure 10:
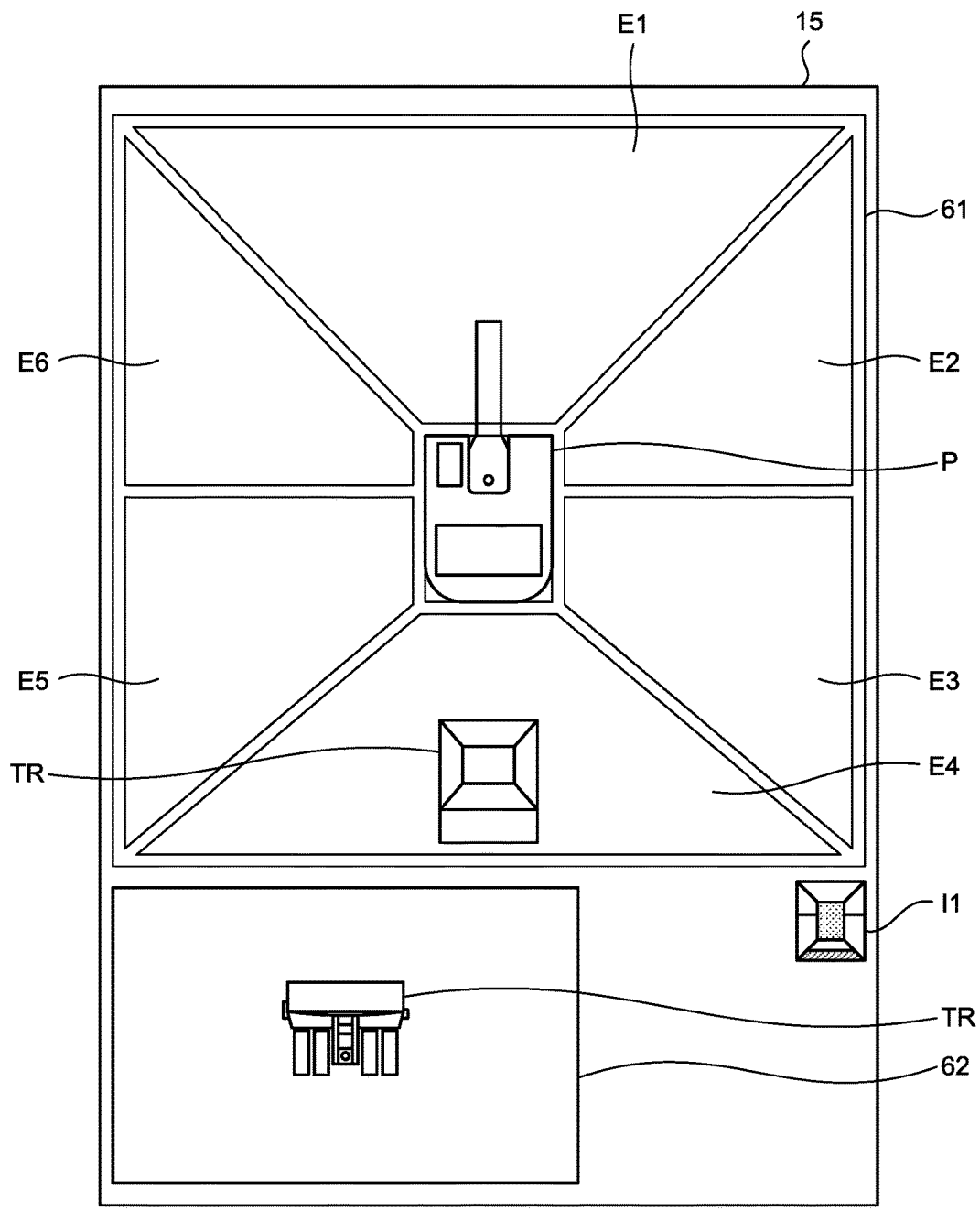
FIG. 10 is a view illustrating an example of an initial screen of a periphery monitoring monitor.

The periphery monitoring monitor 15 illustrated in FIG. 10 is an example of an initial screen, which is displayed first when a key-on operation is performed. In FIG. 10, the bird's eye image 61 is displayed in an upper region of the periphery monitoring monitor 15 and the single camera image 62 is displayed in its lower region. Also, in a lower right side of the periphery monitoring monitor 15, an icon I1 is displayed. The displayed single camera image 62 is a rear side image of the upper swing body 3 and is imaged by the camera C4. The icon I1 indicates seven image positions displayed in the single camera image 62. The single camera image 62 illustrated in FIG. 10 is a rear side image. Thus, a lower region of the icon I1 which region corresponds to a rear position of the upper swing body 3 is filled and displayed. Note that in the bird's eye image 61 and the single camera image 62 illustrated in FIG. 10, there is a dump truck TR on a rear side of the upper swing body 3. In FIG. 10, it can be understood that the dump truck TR is in a position at 180° from the front, where the operation machine 4 is arranged, and is parked in such a manner as to face the outside.

Here, in the bird's eye image 61, there are regions (instruction part) E1 to E7 corresponding to conversion images acquired by the cameras C1 to C7. The periphery monitoring monitor 15 includes a touch panel. When any of the regions E1 to E7 is touched and selected, the display control unit 53 performs switching to a single camera image 62 corresponding to the selected region. More specifically, when the regions E1 to E7 are selected, switching into the single camera images 62 by the cameras C1 to C7 is respectively performed. Along with the switching into the single camera image 62, a display content of the icon I1 is simultaneously switched. In FIG. 10, by selection of the region E4, a state becomes identical to a state in which a switching display into a single camera image 62, which is a rear side image, is performed.

[Image Switching Process of Periphery Monitoring Monitor]

Figure 11:
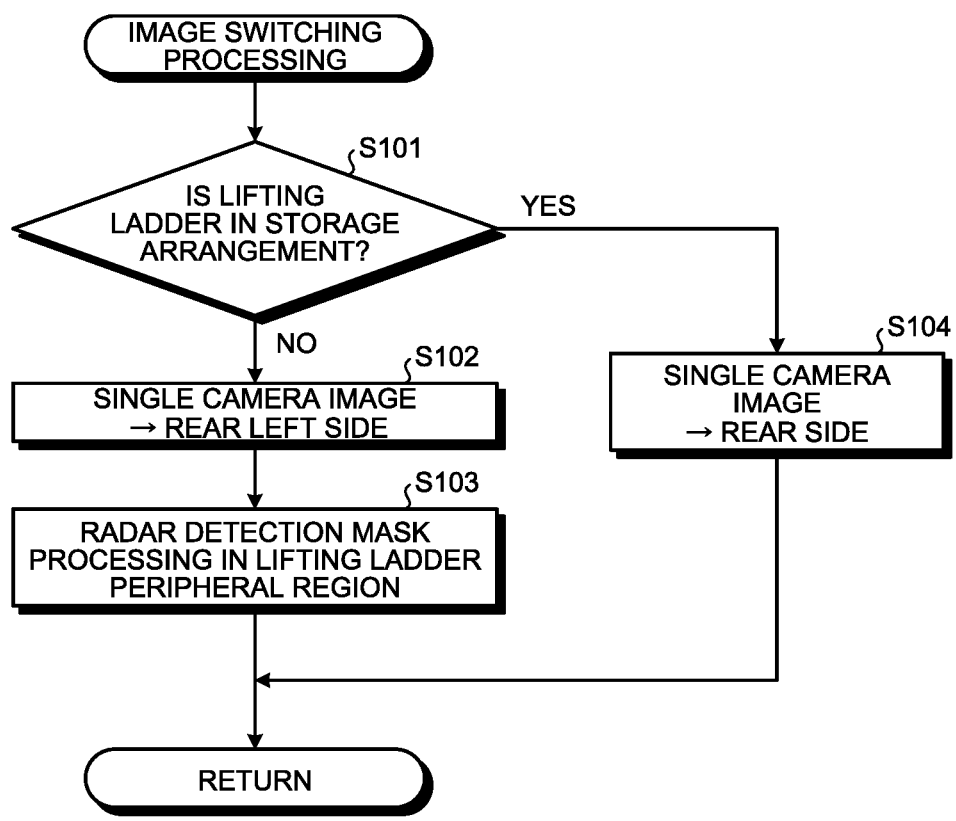
FIG. 11 is a flowchart illustrating an image switching processing procedure in the periphery monitoring monitor performed by a controller.

FIG. 11 is a flowchart illustrating an image switching processing procedure of the periphery monitoring monitor 15 performed by the periphery monitoring controller 40. As illustrated in FIG. 11, first, the periphery monitoring controller 40 determines whether the lifting ladder 9 is in the storage arrangement (step S101). It is determined whether the lifting ladder 9 is in the storage arrangement or in the usage arrangement based on a stroke amount of the stroke sensor 24a in the lifting ladder hydraulic cylinder 24. Note that in a case of not using the lifting ladder hydraulic cylinder 24, the lifting ladder 9 may be lifted/lowered, for example, by sliding the lifting ladder by manual operation or by using a weight. In the case, it is necessary to provide a sensor to detect whether the lifting ladder is in the storage arrangement. In the present embodiment, the sensor is the stroke sensor 24a. Note that the sensor may be a sensor other than the stroke sensor and may be, for example, a limit switch.

When the lifting ladder 9 is not in the storage arrangement (step S101, No), the lifting ladder 9 is lowered onto the ground and is in the usage arrangement. Thus, in order to display a peripheral condition of a lowered position of the lifting ladder 9, the display control unit 53 switches the single camera image 62 on the periphery monitoring monitor 15 into a rear left image imaged by the camera C5 which includes the lifting ladder 9 in an imaging range (step S102). In this case, the operator can understand a movement of a person (such as supervisor, replacement operator, or maintenance staff) around the lifting ladder. Thus, it is possible to check safety of the periphery during replacement of an operator, during maintenance, or when operation is started. Also, in a case where the lifting/lowering switch 9c is provided in the operating room 6, when a rear left image in which a periphery of the lifting ladder 9 is imaged is displayed as the single camera image 62, an operator on a driver seat can easily understand a condition or a movement of a person, who gathers around a position onto which lifting ladder 9 is lowered, without going out of the operating room 6 and moving to the catwalk 9b. Also, when a large rock is in a position onto which the lifting ladder 9 is lowered, the operator cannot go down to the ground. However, when the rear left image is displayed as the single camera image 62, the operator can easily understand a peripheral environment of the position onto which the lifting ladder 9 is lowered.

Then, the display control unit 53 masks a radar detection process with respect to the lifting ladder peripheral region (step S103). The masking has the following meaning. That is, even when a radar detects an obstacle, a process supposed to be performed is controlled based on the obstacle. In the present embodiment, when an obstacle is detected by the radars R1 to R8, a point on obstacle information or a blink display is displayed on the bird's eye image 61 and the single camera image 62 and alarm activation by sounding of the buzzer 17 in the obstacle information is performed (only one may be output). However, when the mask processing in step S103 is performed, even in a case where an obstacle is detected in the lifting ladder peripheral region, the above-described obstacle information is not output. When the lifting ladder is not in the storage arrangement, that is, when the lifting ladder is in the usage arrangement or in a transition state, there is a case where a supervisor, a replacement operator, or a maintenance staff may move around the lifting ladder. Thus, when such obstacle information is output each time, it is troublesome for the operator. In the case, the operator is not bothered by an output of the obstacle information and can understand a peripheral condition of the lifting ladder 9 based on the bird's eye image 61 and the single camera image 62. After the process in step S103, the process goes back to step S101. Note that as a detail way of the "making," a way in which detection itself by a sensor is not performed and process is stopped in a process of transmitting a signal from the sensor to the display control unit may be used other than the above embodiment.

On the other hand, when the lifting ladder 9 is in the storage arrangement (step S101, Yes), the display control unit 53 preferably switches the single camera image 62 on the periphery monitoring monitor 15 to a rear image by the camera C4 (step S104).

In image switching process on the periphery monitoring monitor 15 according to the present embodiment, when the lifting ladder 9 is in a state of the usage arrangement including a state being lifted/lowered, a rear-left image, which is imaged by the camera C5 and in which the lifting ladder 9 is included, is displayed as the single camera image 62. Thus, when the lifting ladder 9 is in the usage arrangement in which the lifting ladder 9 is lowered, it is possible to easily understand the peripheral condition of the lifting ladder 9. Also, when the lifting ladder 9 is in a state of the storage arrangement, a single camera image is displayed, which is imaged by the camera C4 and in which a rear side of the upper swing body 3 is imaged. Thus, it is possible to improve visibility of the operator before operation of the excavator 1.

Figure 12:
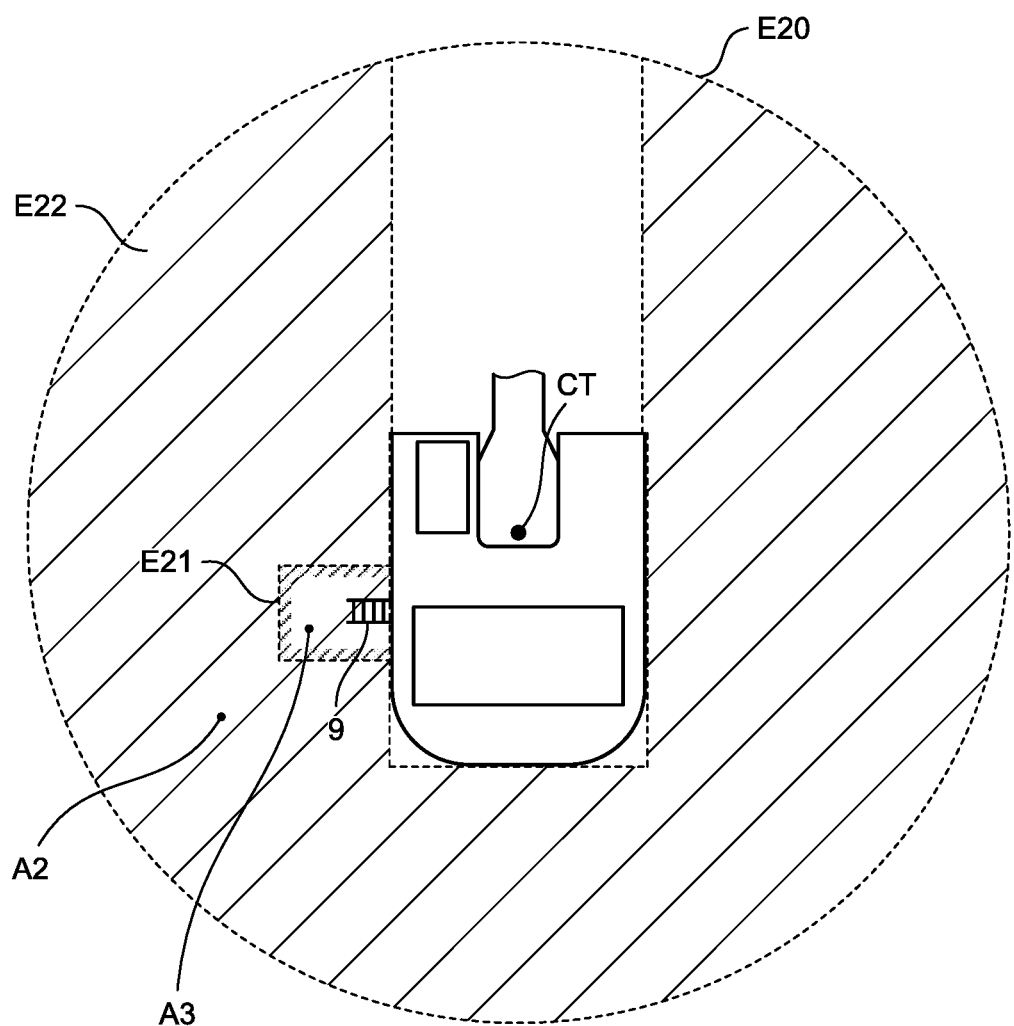
FIG. 12 is a view illustrating a lifting ladder peripheral region in which radar detection process is masked.

Next, FIG. 12 will be described. FIG. 12 is a view illustrating the lifting ladder peripheral region E21 in addition to the above-described region E20 and region E22.

As described above, the region E21 is a region in which a masking process of radar detection is performed when the lifting ladder is not in the storage arrangement. Even in a case where an obstacle is detected in the region when the lifting ladder is not in the storage arrangement, the obstacle information (such as buzzer sounding, point displayed on bird's eye image, or blink display) is not output. Note that only the buzzer sounding may be controlled and a point or a blink display may be displayed on the bird's eye image.

Alternatively, the opposite of the above may be performed. For example, when an obstacle is detected at a position of the point A2 in FIG. 12, the position of the point A2 is in the region E20 and the region E22, where obstacle information is output, and is outside of the region E21 where the obstacle information is not output. Thus, the obstacle information is output. On the other hand, when an obstacle is detected at a position of the point A3, the position of the point A3 is in the region E20 and the region E22, where obstacle information is output, and is also in the region E21 where the obstacle information is not output. Thus, the obstacle information is not output. Note that a size or a shape of the lifting ladder peripheral region E21 are not necessarily limited as long as the lifting ladder 9 is included in the region.

Note that even when a lock lever (a lever to cut off a flow channel of all hydraulic circuit for the operation machine, swing, and traveling) is operated or when a parking is performed, in which a swing lock or the like is set, a display screen of the periphery monitoring monitor 15 is kept. However, even when an obstacle is detected by the radars R1 to R8, sounding by the buzzer 17 or a display of the obstacle information onto the periphery monitoring monitor 15 may not be performed. When there is a person or a vehicle around the excavator during parking, if where sounding by the buzzer 17 or a display of the obstacle information onto the periphery monitoring monitor is performed, it is troublesome for the operator.

Note that the present invention is not limited to the above-described embodiment. It should be understood that a change, modification, or the like within the scope of a purpose of the present invention be included in the present invention.

With respect to "changing an output content related to information acquired by an acquisition unit" described in claims, in the present embodiment, a setting is performed in such a manner that a single camera image is switched into a predetermined camera image in accordance with a lifted/lowered state of a ladder. However, a bird's eye image may be switched into a predetermined single camera image. Also, a switching may be performed into a predetermined single camera image from a machine gauge display to display an engine water temperature, an oil temperature, a remaining amount of combustion or the like. In addition, a switching may be performed into a predetermined single camera image from a failure information display indicating a trouble or the like of a device or a user menu display for various kinds of setting by an operator.

Also, according to a lifted/lowered state of a ladder, a display region (display size of image) of a single camera image or a bird's eye image may be changed. For example, when a ladder is on the ground, a single camera image in which the ladder is imaged may be enlarged and displayed. Alternatively, a single camera image in which the ladder is imaged relatively may be contracted and displayed while the bird's eye image is enlarged and displayed.

In the above-described embodiment, the periphery monitoring monitor 15 is provided separately from the monitor 16. However, the present embodiment is not limited to this and may be configured to display the bird's eye image 61 or the single camera image 62 on the monitor 16. Also, the periphery monitoring monitor 15 is configured as a touch panel display, but a normal display in which a touch sensor is not embedded may be used.

In the above-described embodiment, the bird's eye image 61 and the single camera image 62 are simultaneously displayed on the periphery monitoring monitor 15. However, the present invention is not limited to this and may be configured to display only the bird's eye image or the single camera image on the periphery monitoring monitor 15.

Also, in the above-described embodiment, in a region in a touch panel display 60 in which region images imaged by cameras 61 to 67 are displayed, an image imaged by only one of the cameras 61 to 67 is displayed but two or more images may be displayed simultaneously. Also, in the above-described embodiment, seven cameras are provided in an outer periphery of the upper swing body 3. However, a periphery monitoring apparatus may include less cameras or more cameras.

Also, in the above-described embodiment, the periphery monitoring apparatus is configured in such a manner that a radar and a camera operate together. However, this is not the limitation and the periphery monitoring apparatus may only include a single camera.

Also, a description has been made based on a mining excavator used in a mine or the like. However, the present invention may be also applied to an excavator used in a construction site. In addition, the lifting/lowering switch 9c, which is provided to the catwalk 9b in the present embodiment, may be provided in the operating room 6.

Note that a description has been made with respect to the excavator in the above-described embodiment. However, an application to an operation machine such as a dump truck, a bulldozer, or a wheel loader may also be possible as long as the operation machine includes a lifting ladder.

Figure 13:
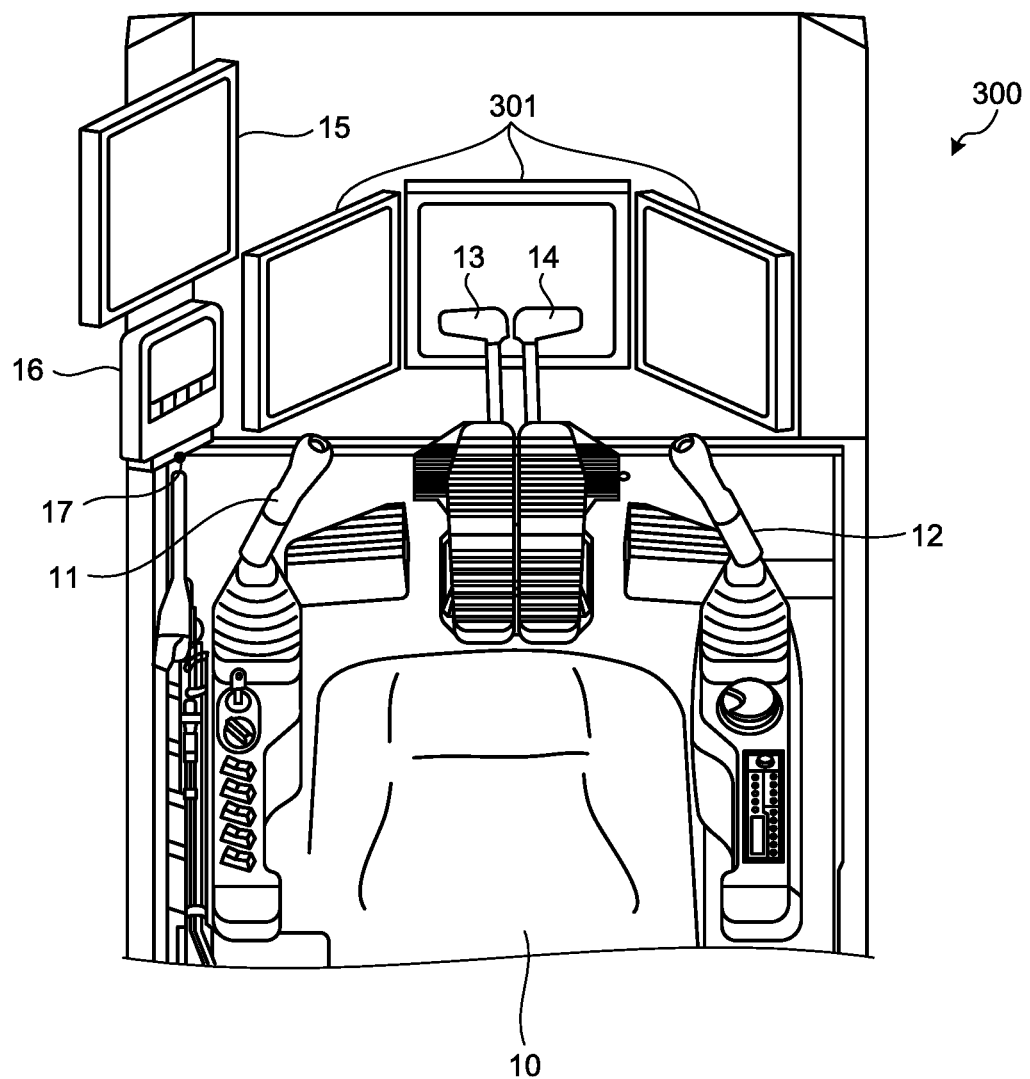
FIG. 13 is a view illustrating an example in which the periphery monitoring monitor is provided in a remote control seat.
Figure 14:
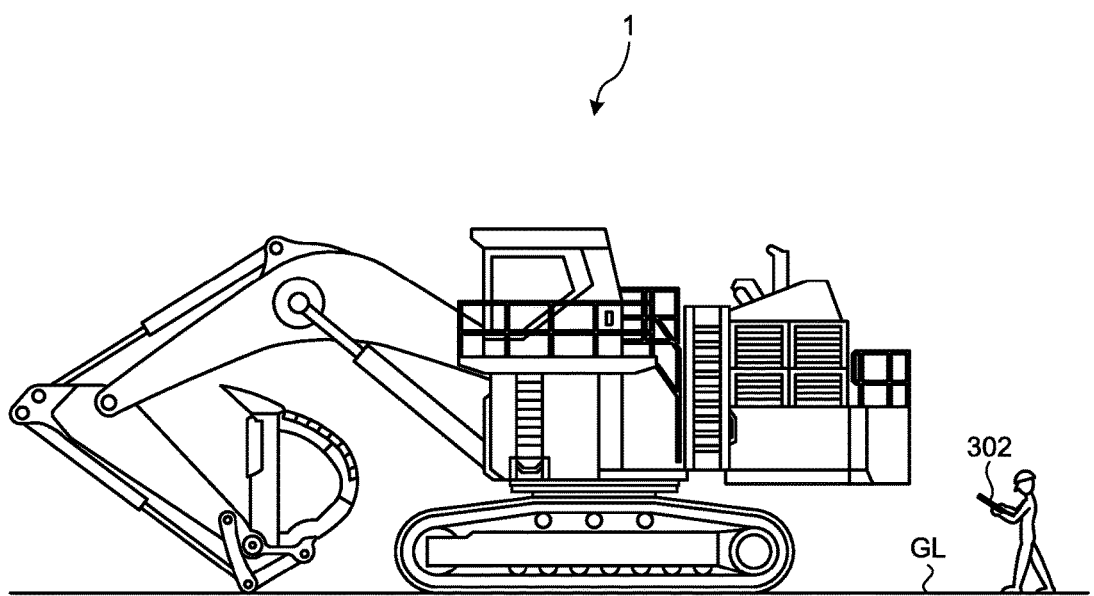
FIG. 14 is a view illustrating an example in which a periphery monitoring monitor is provided in a mobile terminal.

Also, in the above-described embodiment, a configuration in which a periphery monitoring monitor 15 or a buzzer 17 is provided in an operating room 6 of an operation machine has been described. However, this may be provided in a different place such as a remote control seat 300, which is illustrated in FIG. 13 and which is to perform remote control of an operation machine, or a control room that is in a mine and that performs overall control/management of a plurality of operation machines. Also, a remote control monitor 301 illustrated in FIG. 13 may be used as the periphery monitoring monitor. Moreover, as illustrated in FIG. 14, a periphery monitoring monitor 15 or a buzzer 17 may be provided in a mobile terminal 302 and an operator may see a bird's eye image or the like displayed on the mobile terminal 302. Here, in a case where a bird's eye image is displayed on a periphery monitoring monitor 15 in the remote control seat 300 or the control room, or in a case where the mobile terminal 302 is used as a periphery monitoring monitor 15 or a buzzer 17, a some kind of communication unit may be provided in each of an operation machine, and the remote control seat 300, the control room, the mobile terminal 302, or the like and information such as a bird's eye image may be transmitted/received therebetween.

REFERENCE SIGNS LIST 1 excavator
2 lower traveling body
3 upper swing body
4a boom
4b arm
4c bucket
4d boom cylinder
4e arm cylinder
4f bucket cylinder
4 operation machine
5 cab base
6 operating room
7 power container
8 counter weight 9 lifting ladder
9a stairs
9b catwalk
9c lifting/lowering switch
10 operator sheet
11, 12 operation lever
13, 14 traveling lever
15 periphery monitoring monitor
16 monitor
17 buzzer
20, 32 bracket
21, 25, 27 pin
23 ladder supporting frame
24 lifting ladder hydraulic cylinder
24a stroke sensor
26 lever member
31 swing frame
40 periphery monitoring controller
42 communication controller
43 monitor controller
44 engine controller
45 pump controller
51 image processing unit
52 obstacle processing unit
53 display control unit
54 bird's eye image generation unit
55 image composition unit
56 output control unit
61 bird's eye image
62 single camera image
63 region
70 operation amount detection unit
300 remote control seat
301 remote control monitor
302 mobile terminal
C camera group
C1 to C7 camera
CT swing center
E1 to E7 region
E20 region
E21 lifting ladder peripheral region
GL ground surface level
I1 icon
P, P1 to P7 image
P11 to P17 conversion image
R radar group
R1 to R8 radar
TR dump truck

The invention claimed is:

1. A periphery monitoring apparatus of an operation machine, comprising:
 a plurality of cameras configured to acquire a peripheral condition of the operation machine;
 a display unit configured to display a camera image obtained by at least one of the cameras;
 a detector configured to detect a lifted/lowered state of a lifting ladder provided in the operation machine; and
 an output controller configured to change a display on the display unit between a camera image in which the lifting ladder is included in an imaging range of the camera image and a camera image in which the lifting ladder is not included in an image range of the camera image in accordance with the lifted/lowered state of the lifting ladder detected by the detector.

2. The periphery monitoring apparatus of the operation machine according to claim 1, wherein the output controller is configured to change the camera of the camera image to be displayed on the display unit in accordance with the lifted/lowered state of the lifting ladder.

3. The periphery monitoring apparatus of the operation machine according to claim 1, wherein when the lifting ladder is not in a storage arrangement, the output controller is configured to change the display onto the display unit to display the camera image in which the lifting ladder is included in the imaging range of the camera image.

4. The periphery monitoring apparatus of the operation machine according to claim 1, wherein when the lifting ladder is in a state of the storage arrangement, the output controller is configured to change the display onto the display unit to display a camera image in which a rear side of the upper swing body is imaged.

5. The periphery monitoring apparatus of the operation machine according to claim 2, further comprising:
 an image processing unit configured to generate a bird's eye image of a periphery of the operation machine based on images imaged by the plurality of cameras,
 wherein the output controller is configured to display, onto the display unit, the bird's eye image generated by the image processing unit, a machine gauge display, a failure information display, and a user menu display.

6. The periphery monitoring apparatus of the operation machine according to claim 1, wherein the display unit is provided in a remote control seat, a control room, or a mobile terminal.

7. The periphery monitoring apparatus of the operation machine according to claim 1, wherein the detector is a stroke sensor for detecting a stroke amount of a lifting ladder hydraulic cylinder of the lifting ladder.

8. A periphery monitoring apparatus of an operation machine, comprising:
 a plurality of radars configured to acquire a peripheral condition of the operation machine;
 an output device configured to, when an obstacle is detected in a detection region based on an information acquired by the radars, output an obstacle information;
 a detector configured to detect a lifted/lowered state of the lifting ladder provided in the operation machine; and
 an output controller configured to change a range of the detection region in accordance with the lifted/lowered state of the lifting ladder detected by the detector.

9. The periphery monitoring apparatus of the operation machine according to claim 8, wherein the output controller is configured to output the obstacle information to the output device when the obstacle is detected based on information acquired by the radars.

10. The periphery monitoring apparatus of the operation machine according to claim 8, wherein the output device refers to a buzzer, and
 the obstacle information refers to buzzer sounding.

11. The periphery monitoring apparatus of the operation machine according to claim 8, wherein the output controller is configured to perform the masking process on an obstacle detection of a periphery of the upper swing body, which detection is performed by the plurality of radars, when a lock lever is being operated or when a swing lock is being set.

12. The periphery monitoring apparatus of the operation machine according to claim 8, wherein the output controller is configured to perform a masking process on a detection of a lifting ladder peripheral region, in which the lifting ladder is included, when the lifting ladder is not in a storage arrangement.

13. The periphery monitoring apparatus of the operation machine according to claim 8, wherein, in a case where the lifting ladder is not in the storage arrangement, the output controller does not output the obstacle information to the output device even when the obstacle is detected based on an information acquired by the radars.

14. A periphery monitoring method of an operation machine, comprising:
   acquiring via a plurality of cameras a peripheral condition of the operation machine;
   displaying via a display unit a camera image obtained by at least one of the cameras;
   detecting via a detector a lifted/lowered state of a lifting ladder provided to the operation machine; and
   changing via an output controller a display on the display unit between a camera image in which the lifting ladder is included in an imaging range of the camera image and a camera image in which the lifting ladder is not included in an image range of the camera image in accordance with the lifted/lowered state of the lifting ladder detected by the detector.

15. A periphery monitoring method of an operation machine, comprising:
   acquiring via a plurality of radars a peripheral condition of the operation machine;
   outputting, when an obstacle is detected in a detection region based on an information acquired by the radars, an obstacle information via an output device;
   detecting via a detector a lifted/lowered state of the lifting ladder provided in the operation machine; and
   changing via an output controller a range of the detection region in accordance with the lifted/lowered state of the lifting ladder detected by the detector.

16. A periphery monitoring apparatus of an operation machine, comprising:
   a plurality of cameras configured to acquire a peripheral condition of the operation machine;
   a display unit configured to display a camera image obtained by at least one of the cameras;
   a detector configured to detect a lifted/lowered state of a lifting ladder provided in the operation machine; and
   an output controller configured to change an output content of the camera image displayed on the display unit in accordance with the lifted/lowered state of the lifting ladder detected by the detector,
   wherein the display unit displays the output content which includes both a bird's eye image of a surrounding of the operation machine and a single camera image from one of the cameras on a display screen, the output controller changes the single camera image to a single camera image in which the lifting ladder is included in an imaging range of the single camera image of the operation machine when the lifting ladder is detected in the lowered state and changes the output content to a single camera image of a rear of the operation machine when the lifting ladder is detected in the lifted state.

* * * * *